United States Patent
Sankar et al.

(10) Patent No.: US 9,389,681 B2
(45) Date of Patent: Jul. 12, 2016

(54) SENSOR FUSION INTERFACE FOR MULTIPLE SENSOR INPUT

(75) Inventors: Aditya Sankar, Seattle, WA (US); William Lawrence Portnoy, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 602 days.

(21) Appl. No.: 13/329,777

(22) Filed: Dec. 19, 2011

(65) Prior Publication Data

US 2013/0159350 A1  Jun. 20, 2013

(51) Int. Cl.
| | |
|---|---|
| G06F 7/00 | (2006.01) |
| G06F 17/30 | (2006.01) |
| G06F 3/01 | (2006.01) |
| G06F 3/038 | (2013.01) |

(52) U.S. Cl.
CPC .............. G06F 3/011 (2013.01); G06F 3/017 (2013.01); G06F 3/038 (2013.01); G06F 2203/0381 (2013.01)

(58) Field of Classification Search
None
See application file for complete search history.

(56) References Cited

U.S. PATENT DOCUMENTS

| | | | |
|---|---|---|---|
| 6,580,417 B2 * | 6/2003 | Rosenberg | A63F 13/06 345/157 |
| 2003/0073406 A1 | 4/2003 | Benjamin et al. | |
| 2003/0186663 A1 | 10/2003 | Chen et al. | |
| 2007/0011196 A1 | 1/2007 | Ball et al. | |
| 2007/0239399 A1 | 10/2007 | Sheynblat et al. | |
| 2008/0309774 A1 | 12/2008 | Beng Goh et al. | |
| 2009/0184849 A1 * | 7/2009 | Nasiri et al. | 341/20 |
| 2009/0303204 A1 | 12/2009 | Nasiri et al. | |
| 2010/0127968 A1 * | 5/2010 | Kramer | G06F 3/017 345/156 |
| 2010/0128062 A1 * | 5/2010 | Kramer | G06F 3/017 345/619 |
| 2010/0271302 A1 | 10/2010 | Pering et al. | |
| 2010/0281440 A1 * | 11/2010 | Underkoffler | G06F 3/017 715/863 |
| 2010/0303290 A1 * | 12/2010 | Mathe | 382/103 |
| 2010/0306716 A1 * | 12/2010 | Perez | 715/863 |
| 2011/0018803 A1 * | 1/2011 | Underkoffler | G06F 3/017 345/158 |
| 2011/0098029 A1 * | 4/2011 | Rhoads | G01C 21/3629 455/418 |
| 2011/0098056 A1 * | 4/2011 | Rhoads | G01C 21/20 455/456.1 |
| 2011/0173260 A1 | 7/2011 | Biehl et al. | |
| 2011/0234488 A1 | 9/2011 | Ge et al. | |
| 2011/0254760 A1 | 10/2011 | Lloyd et al. | |
| 2011/0267269 A1 | 11/2011 | Tardif et al. | |
| 2012/0019643 A1 * | 1/2012 | Gideon et al. | 348/77 |

(Continued)

OTHER PUBLICATIONS

Supplementary Search Report Issued in European Patent Application No. 12860801.5, mailed Apr. 2, 2015, 3 pages.
Coyie, et al., "Sensor Fusion-Based Middleware for Smart Homes", In International Journal of Assistive Robotics and Mechatronics, vol. 8, Issue 2, Jun. 2007, pp. 53-60.

*Primary Examiner* — Hexing Liu
(74) *Attorney, Agent, or Firm* — Steve Wight; Valerie See; Micky Minhas (57) ABSTRACT

The subject disclosure is directed towards a sensor fusion interface that enables interaction between one or more entities of a physical environment and a computerized device component. A plurality of sensor modules generate multiple sensor input data associated with one or more entities in an environment and store such data in a shared library in accordance with a uniform and common schema. The multiple sensor input data is refined until a certain level of accuracy is achieved. Using the sensor fusion interface, entity state data is extracted from the shared library and exposed to the computerized device component.

20 Claims, 7 Drawing Sheets

(56) References Cited

U.S. PATENT DOCUMENTS

2013/0076617 A1* 3/2013 Csaszar ............... G06F 3/017
　　　　　　　　　　　　　　　　　　　345/156
2014/0145929 A1* 5/2014 Minnen ............... G06F 3/011
　　　　　　　　　　　　　　　　　　　345/156

OTHER PUBLICATIONS

"Office Action Issued in European Patent Application No. 12860801.5", Mailed Date: Apr. 20, 2015, 7 Pages.

* cited by examiner

SENSOR FUSION INTERFACE FOR MULTIPLE SENSOR INPUT

BACKGROUND

Various physical environments and infrastructures use sensors to collect and synthesize data. For example, a home or a factory may use a video camera system to secure expensive and important documents and/or equipment. A thermostat for a home uses a sensor network to regulate an average temperature. Common consumer devices employ sensors for collecting data, such as mobile phone cameras for taking pictures. Some of these sensors take measurements regarding the real world, such as accelerometers, gyroscopes, Microelectromechanical systems (MEMS) and/or the like. Computer systems and software components integrate sensors into everyday life in order to provide rich information about the real world.

For a considerable number of computerized device components, it is often desirable to utilize multiple sensors to improve the quality of perception. In many situations, sensor measurements need to be valid and accurate. By processing observations of a physical environment over space and time, the sensor measurements may be adjusted into more accurate estimates of certain attributes. Accordingly, computer systems and software components perform various sensor input processing operations until a satisfactory confidence level is achieved. This ensures proper performance along with an enhanced user experience.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a sensor fusion interface for multiple sensor input. In one aspect, various sensor modules and (input) devices provide input data associated with a physical environment. A monitoring component for the physical environment aggregates the input data from disparate sources and performs a cross-sensor synthesis in order to tune the input data and interpret more meaningful information. In one aspect, an interaction mechanism for the monitoring component provides a computerized device component (e.g., a hardware and/or software component, such as a programming logic device, microcode and/or a program including an application, an operating system component, firmware and/or the like) with access to this information, via the sensor fusion interface.

In one aspect, the sensor fusion interface enables interaction between an entity (e.g., a human user) and the computerized device component. The sensor fusion interface accesses a shared library that is coupled to a plurality of sensor modules and stores multiple sensor input data associated with the entity. In one aspect, the shared library uses a common schema to organize the multiple sensor input data to enable other sensor modules to refine such data and re-publish the refined data in the shared library for (possibility) yet another sensor module to refine even further. At some point, the multiple sensor input achieves a certain confidence level and information regarding a state of an entity with respect to the physical environment. On behalf of the computerized device component, the sensor fusion interface and the interaction mechanism extract the entity state data from the shared library and provide the computerized device component with access to the entity state data.

In another aspect, the physical environment includes a plurality of entities that may or may not interact with each other. While monitoring the physical environment, the interaction mechanism may receive requests for entity state data via the sensor fusion interface. In one aspect, some of these requests include configuration data indicating which input modalities to select when fusing sensor input data. The interaction mechanism configures the plurality of sensor modules to produce the type of multiple sensor input data that the computerized device component desires. Once the multiple sensor input data is generated, the interaction mechanism extracts the entity state data and communicates an instance to the computerized device component. The instance may be a copy of or a reference to the entity state data in a (shared) storage unit.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a sensor fusion interface that enables interaction with a computerized (user) device component. In one implementation, for each entity (e.g., human) in a physical environment, an interaction mechanism defines an entity profile comprising a position and/or an orientation at a particular point-in-time. The entity profile may also include speech and/or gesture commands and event hooks that indicate instances when the entity exited a sensor boundary. In one implementation, the entity profile may indicate one or more command/control inputs when exposed to the computerized device component. In one implementation, the interaction mechanism, via the sensor fusion interface, instructs a common knowledge data component to update the entity profile in response to entity activity. In one implementation, the common knowledge data component integrates multiple sensor input from a plurality of sensor modules according to a uniform schema and identifies the entity activity based on the multiple sensor input.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data management in general.

Figure 1:
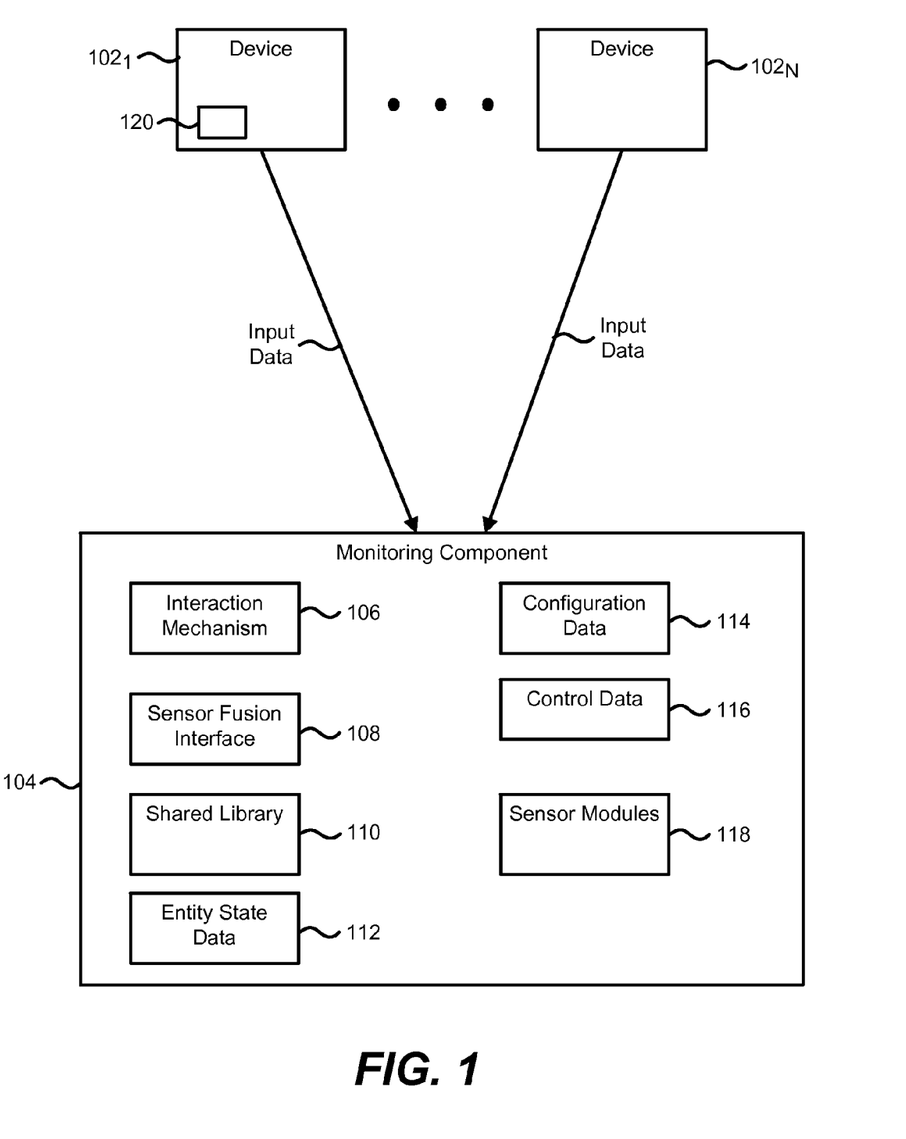
FIG. 1 is a block diagram illustrating an example system for a sensor fusion interface according to one implementation.

FIG. 1 is a block diagram illustrating an example system for a sensor fusion interface according to one implementation. Components of the example system include a plurality of computerized devices $102_1 \ldots _N$ (illustrated as a device $102_1 \ldots$ a device $102_N$ and hereinafter referred to as the devices 102) and a monitoring component 104.

The devices 102 may provide sensor input signals to the monitoring component 104, which in turn stores appropriate raw data for further processing. In one implementation, the devices 102 may include any sensing device that provides input data associated with an entity and/or a physical environment, such as an electronic digitizer, a mobile phone, a microphone, a multimedia capture device (e.g., a camera), an imaging device, a depth camera, a keyboard and pointing device, commonly referred to as mouse, trackball or touch pad. Other embodiments of the devices 102 may include a joystick, game pad, and any other wireless or wired controller. Each of the devices 102 may be physically attached to the monitoring component 104 or remotely located.

Examples of the devices 102 may also include computer vision devices, microphones, accelerometers, gyroscopes, magnetometers, compasses, clocks, Global Positioning System (GPS) devices, thermometers, humidity sensors, light sensors, infrared sensors, signal strengths of nearby devices, access points, or other transmitters, depth sensors and/or the like. These example devices 102 can sense environmental and other data, such as current room and/or device temperature, whether the user is moving and at what speed, whether the user is alone or with someone else, the amount of ambient light, computer-related or output device-related data (e.g., device battery life, available power, running programs and services), and so forth.

In one implementation, the monitoring component 104 may be configured to provide an integration point for the input data generated by the device 102 and may include an interaction mechanism 106 for exposing the sensor fusion interface 108 to one or more computerized device components that process multi-modal (sensor) input data associated with one or more entities. The monitoring component 104 may also include a shared library 110, entity state data 112, configuration data 114, control data 116 and sensor modules 118. As described herein, the shared library 110 may correspond to a schematized version of the multiple sensor input data (e.g., audio data, video data, image data and/or the like in a common format or type system). The entity state data 112 may indicate a pose for each entity (e.g., Cartesian coordinates for a position and orientation based on the physical environment as a reference frame). The configuration data 114 and the control data 116 may represent interactions between each entity and a computerized device component 120 (e.g., a type of hardware or a software component, such as a program).

The shared library 110, as described herein, includes input data, such as measurements, from the devices 102 and/or the sensor modules 118. These measurements undergo cross-synthesis whereby various ones of the devices 102 and/or the sensor modules 116 access the input data and perform additional processing, such as speech/facial/gesture recognition, which is published in the shared library 110 for another device and/or sensor module to add meaningful and useful information. After a period of time, the monitoring mechanism 104 correlates the various input data and determines an entity state from multiple sensor input, which may be defined as any combination of a pose, spoken words, gestures and/or the like and stored in the entity state data 112. The interaction mechanism 106 extracts the entity state data 110 and provides the computerized device component 120 with a copy.

In one implementation, the one or more entities may include a player or players in a gaming/simulator program, a mobile phone user that desires augmented reality content and/or services, music playlist system user(s) and so forth. Computerized device component performance and user/player experience may be proportionally related to the capability of these computerized device components to process the multiple sensor input data and determine meaning/intent associated with entity activities, such as entity movement (e.g., symbolic activity, such as a gesture command), interactions between two or more entities and/or the like.

In one implementation, the configuration data 114 may define various forms of the entity activities that translate into control inputs/commands for the computerized device component 120, which may be stored in the control data 114 and communicated to the computerized device component 120. Over a period of time, the interaction mechanism 106 identifies one of these entity activities by tracking changes to an entity state. In addition to or in combination with speech/gesture-based control, a change in entity pose may explicitly or implicitly indicate an intended alteration of the computerized device component 120 behavior. For example, the mobile phone user may point a device camera upwards towards a sky and clearly instruct a mobile phone component to, "Augment my current screen view of the night sky with constellation names," which causes the monitoring component 104 to fuse audio data with speech recognition results and image data. Similarly, a change in a position or orientation of a device being manipulated by the entity may also indicate a desired change in device component behavior.

As another example, the interaction mechanism 106 may interpret a particular entity's movement (e.g., walking a few steps, jumping in the air and/or the like) and orientation (e.g., look or facing/body direction) as semantic control inputs for moving and orienting a virtual character (e.g., an avatar of the entity). A depth camera and a gyroscope in a pointing device may provide measurements regarding the entity movement and bodily orientation. Furthermore, another gyroscope on a helmet device may provide measurements regarding facial orientation. If the entity jumps, ducks or otherwise moves up and down, an accelerometer (e.g., a micromechanical accelerometer or gravimeter) on may measure entity acceleration with respect to gravity (i.e., g-force), direction, displacement and/or duration. These measurements may be combined into multiple sensor input data and correlated to produce the entity state data 112 for different points-in-time.

A combination of the devices 102 and the sensor modules 118 may provide sets of sensor input (data) from multiple modalities to the monitoring component 104. The devices 102 may also provide environmental data and/or other sensed data to the monitoring component 104. More particularly, when taken together the devices 102 have the ability to gather detailed information about a physical environment and the entity or entities being tracked and/or analyzed by the monitoring component 104. The configuration data 114 may indicate certain ones of the devices 102 and/or the sensor modules 118 to use for generating the multiple sensor input data. By default, the interaction mechanism 106 aggregates sensor inputs from all of the devices 102 and/or the sensor modules 118. The configuration data 114 may indicate that an error should be returned if any of the devices 102 and/or the sensor modules 118 is not available.

In one implementation, the sensor modules 118 may include software components or agents for one or more of the devices 102. For example, a mobile phone that includes an accelerometer may use an agent on the monitoring component 104 to communicate motion data. As another example, a camera may use a software module to convert raw image data into a formatted version and/or extract feature data from the image data. Alternatively, the camera may store raw data on the monitoring component 104.

In another implementation, some of the sensor modules 118 include software-based sensors that provide high-level or fine-grained information associated with the physical environment and/or the entity. In addition to raw sensor inputs, these sensor modules 118 process appropriate input data to provide meaningful information. For example, the sensor modules 118 may include a facial recognition module, a speech recognition module, a gesture recognition module and/or the like that process the sensor inputs provided by the devices 102 and identify facial features, spoken words and/or bodily pose/movements, respectively, of a particular entity.

Figure 2:
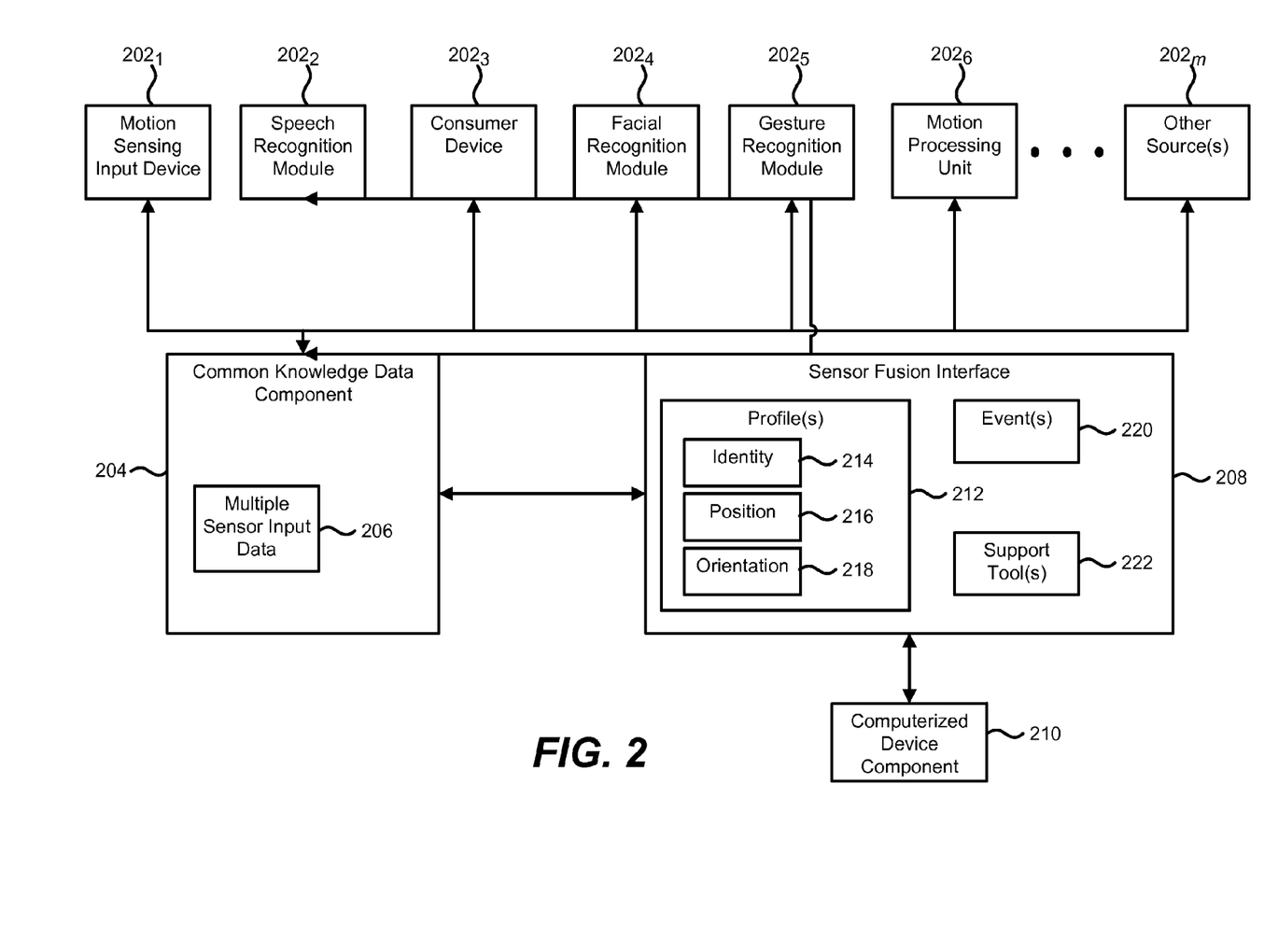
FIG. 2 represents example architecture for a sensor fusion interface that enables interactions between entities and an computerized device component according to one implementation.

FIG. 2 represents example architecture for a sensor fusion interface that enables interactions between entities and a computerized device component according to one implementation. As described herein and illustrated in FIG. 1, a combination of the devices 102 and the sensor modules 118 may include a set of one or more game console cameras (e.g., depth sensing cameras), web cameras, microphones, digitizers, pens/pointing devices, accelerometers and "other" devices, which may represent sources $202_1$-$202_m$ of data (e.g., knowledge data) corresponding to possible input modalities.

While the sources $202_1$-$202_6$ may illustrate specific examples of various devices and/or sensor modules, these examples are not exhaustive of a potential configuration of the devices and/or sensor modules and the other source(s) $202_m$ may include any number of devices and/or sensor modules including motion controller components, such as a magnetometer, infrared structured light and/or the like. Other input data that may be utilized include electronic ink from a pen device, gaze (direction, elapsed time), proximity sensing, speech, air gestures, body position/body language, facial expression, mirroring as reinforcement (e.g., looking in the direction of pointing, miming), touch, multi-touch mouse, brainwave computer input, keyboard, in-air mouse (e.g., soap), musical instrument (e.g., MIDI), manipulating a physical interface (e.g., a glove, or haptic interface), and so forth. Mood sensing, such as combining facial expression with facial color changes, temperature, grip pressure and/or other possible indicators of mood is another feasible input modality.

In one implementation, a motion sensing input device $202_1$ may enable one or more entities (e.g., one or more players interacting with a gaming console) to interact naturally with interfaces (e.g., a gaming console interface) using gestures, body movements and/or voice commands. The motion sensing input device $202_1$ may include various media or multimedia capture mechanisms, such as a color camera (e.g., Red Green Blue (RGB) camera) to capture visual data, a depth camera to detect entity presence and distance from a front of the device, a microphone array to capture audio data within a physical environment and/or the like.

In one implementation, the motion sensing input device $202_1$ provides various environment and/or entity data, such skeletal tracking information that corresponds to image data representing one or more entities (e.g., people, animals, robots and/or the like). The skeletal tracking information may describe entity movements within a field of view. There may be a portion of the field of view where the motion sensing input device $202_1$ may not capture and/or analyze entity movement (e.g., a dead zone or a neutral zone). In one implementation, the entity movement or gestures within this portion may calibrate the capture mechanisms employed by the motion sensing input device $202_1$.

In one implementation, the motion sensing input device $202_1$ may also provide environment and/or entity data that is generated by a XYZ-depth camera, which examines color camera stream data and depth data to compute a distance between an object or an entity and the camera. In another implementation, the motion sensing input device $202_1$ may process audio data provided by a four-element microphone array. For example, the motion sensing input device $202_1$ may apply an acoustic noise and echo cancellation technique and/or beam formation to identify a current sound source.

In one implementation, a speech recognition module $202_2$ may decipher audio data into words/sentences according to a spoken language grammar. The speech recognition module $202_2$ may process the audio data from any source, such as the microphone array of the motion sensing input device $202_1$ or one or more "other" source(s) $202_m$, such as a computer microphone, a mobile phone voice recorder and/or the like. The speech recognition module $202_2$ may be initiated with a dictionary comprising words used in the spoken language grammar. The speech recognition module $202_2$ may apply any technique to the audio in order to identify/classify speech into the words.

In one implementation, a consumer device $202_3$ may include any computing device (e.g., a laptop, a desktop, a tablet and/or the like), mobile device (e.g., any handset device, such as a mobile phone, a smart phone and/or the like), gaming console controllers, motion pointer remote controllers and/or the like. The consumer device $202_3$ may include one or more sensor modules and/or one or more (input) devices. For example, the consumer device $202_3$ may include a built-in gyroscope along with an accelerometer and an interface (e.g., an external bus and a port) for communicating with a magnetometer (compass). The consumer device $202_3$ may also include a camera (with or without a microphone) that provides image data associated with the one or more entities. These low-power high accuracy MEMS devices provide very fine grained information about entity pose and/or device pose (e.g., a position and/or orientation of the entity or the device).

In one implementation, a facial recognition module $202_4$ may detect and identify (human) faces in image data (e.g., one image or a set of images) and/or video data (e.g., video frames). Embodiments of the facial recognition module $202_4$ may include hardware components and/or software components. The facial recognition module $202_4$ may be trained prior to deployment using an image set having correctly labeled features for previously verified entity faces. After being trained, the facial recognition module $202_4$ may process an image captured by the motion sensing input device $202_1$, the consumer device $202_3$, and/or one of the other source(s) $202_m$ (e.g., a web camera, a mobile phone camera, a three-dimensional or two-dimensional digital camera belonging to another entity and/or the like) and determine which entity from the image set may be present in the environment. A size of the training set may depend on the environment type. For example, a relatively small image set may be sufficient for a family or a small office; whereas, a larger image set may be used for a global organization. As an alternative mechanism for verifying entity identity within the environment, a personal Radio Frequency (RF) Identification tag attached to the entity may periodically transmit location data.

In one implementation, a gesture recognition module $202_5$ may interpret entity (e.g., human) gestures originating from any bodily motion and/or state using various techniques (e.g., computer vision and image processing techniques). A gesture recognition library may used to identify gestures and human body language, such as emotion, posture/pose, gait and/or proxemics, from a face and hand gesture. The gesture recognition module $202_5$ may be trained using recorded and previously verified gestures from suitable devices, such as the motion sensing input device $202_1$, the consumer device $202_3$, a Gyroscope, a motion processing unit $202_6$ and/or the like, the gesture recognition module $202_5$ may model the gesture in order to recognize future invocations of the same gesture.

In one implementation, a motion processing unit $202_6$ may include an integrated circuit (e.g., a chip) embedded within another device or structure. For example, embodiments of the motion processing unit $202_5$ may provide include tablet computers, mobile phones, (remote) motion controllers, motion pointer remote controls and/or the like. In one implementation, the motion processing unit $202_6$ may include an embedded three (3)-axis gyroscope, a 3-axis accelerometer and a hardware accelerator engine with an auxiliary port that interfaces to third-party digital sensors, such as magnetometers. Hence, the motion processing unit may facilitate integrated nine (9)-axis sensor fusion and an accurate six (6)-degree-of-freedom motion capture. An example motion processing unit may be an INVENSESNE® MPU-60X0 Motion Processing Unit.

The motion processing unit $202_6$ may combine acceleration and rotational motion plus heading information into a single data stream to a common knowledge data component 204. The data stream may indicate changes in entity/device orientation and/or pose from the gyroscope, accelerometer and/or magnetometer. The data stream may exhibit unwanted perturbations in the data stream, such as drift over a period of time, which may be partially corrected by fusing accelerometer data with gyroscope data, apply a Kalman filter to the data stream and/or periodically calibrate the gyroscope with a magnetic compass.

The common knowledge data component 204 (e.g., blackboard, which in the art generally refers to a well-known software design pattern) may define a global data structure, schema or type system that is configured on all of the sources $202_1$-$202_m$ of knowledge. Using the global data structure, schema or type system, the common knowledge data component 204 maintains a shared library of raw input data, problems, partial solutions, alternatives, suggestions, contributed information, final, solutions, control information and a communication medium/buffer. The common knowledge data component 204 implements a sensor interface that defines common properties (e.g., methods, attributes, data members and/or the like) for all devices and sensor modules (hereinafter collectively referred to as sensors) that provide multiple sensor input data 206. For example, the sensor interface may create an object instance having a sensor name, initialization/un-initialization methods, calibration methods and a status flag to denote whether the sensor is tracking the entity. The sensor interface may be extended to communicate with any sensor.

In one implementation, the common knowledge data component 204 may also implement an explicit control mechanism permitting the sources $202_1$-$202_m$ to respond opportunistically to changes on the common knowledge data component 204. One type of problem that is solved by the common knowledge data component 204 is to define, with specificity, a meaning and intention behind an entity activity and, for translating the meaning and intention into computerized device component (e.g., an application) behavior.

In one implementation, the common knowledge data component 204 includes a centrally accessible data store to which the devices 102 and/or the sensor modules 118 may write/read and to which a sensor fusion interface 208 may provide the computerized device component 210 with access. The sensor fusion interface 204 may also communicate the contents of the data store to a recipient. The common knowledge data component 204 stores current and/or historical data, such as the camera image, a voice/gesture command, an entity identity in the camera image, a list of entities (e.g., players) and/or the like. The common knowledge data component 204 may be dynamically modified to accommodate input data from any sensor that is initialized in a particular scenario.

If the contents of the common knowledge data component 204 change (e.g., a new camera image frame arrives), the common knowledge data component 204 generates an event and exposes the event to the computerized device component 210. Other modules that wish to consume the contents can subscribe to this event and read fresh data from the common knowledge data component 204 instance. This way sensors can cross-communicate in a clean and efficient way, without having any intimate knowledge of each other's existence.

The common knowledge data component 204 may also track, monitor and/or analyze an entity state. By way of example, when a sensor or set of sensors detects that a entity/player is present (e.g., the motion sensing input device $202_1$ recognizes a skeleton and/or the facial recognition module detects a face), the sensor or set of sensors invokes the common knowledge data component 204 AddPlayer( ) method, which adds the entity as a new player to a list of currently tracked entities, configures the common knowledge data component 204 to aggregate and fuse input data associated with the added entity, and fires a global event to the computerized device component 210 to which other sensors may subscribe.

In one implementation, any data associated with the added entity, such as identity 214, position 216, orientation 218, speech/gestures and/or the like, may be appended to a corresponding one of a set of profiles 212. The position 216 may refer to a whole body position and/or a body part position (e.g., a hand position) in three-dimensional space. Similarly, the orientation 218 may refer to bodily orientation and/or a specific body part orientation, such as a facial orientation. Furthermore, the position 216 and the orientation 218 may refer to a device being manipulated by the entity, such as a mobile phone or a pointing device. In one implementation, an example one of the profiles 212 encapsulates the following data capturing the multiple sensor input data for any particular entity: a skeletal position, a hand position, current speech command, head position and identity. Once these fields are substantially completed, the sensor fusion interface 208 may communicate the profile to the computerized device component 210.

The sensor fusion interface 208 facilitates multi-sensor and multi-person program development by providing entity-related information to the computerized device component 210 and/or the program developers. In one implementation, the sensor fusion interface 208 exposes a current entity state and one or more event (hooks) 220 for instances where the entity leaves a detection boundary or range associated with a sensor. The sensor fusion interface 208 also exposes current command/control inputs issued by the entity for the computerized device component 210. In another implementation, the sensor fusion interface 208 also provides the computerized device component 210 with sensor initialization using default options and/or custom options for selected sensors.

In yet another implementation, the sensor fusion interface 208 also provides one or more support tools 222 for interacting with the entity. One example support tool 222 includes software code that, when executed, converts raw directional input data or other motion data from sensors, such as the motion sensing input device $202_1$ or the consumer device $202_3$, into semantic control input, which may be achieved through calibration and dead-zone assignment as generally described herein.

Another example support tool 222 includes software code that, when executed, enables the developers to create an abstract environment model (e.g., a model illustrating rooms in a house and connections between the rooms). Specific sensors may be added to certain areas (e.g., rooms) of the environment model. For instance, each room in a three-room house may be fitted with the motion sensing input device $202_1$, which enables entity tracking about the environment. As the entity moves into different areas, the computerized device component 210 may transfer entity tracking duties from one sensor to another sensor that may be closer to the entity.

As an example, the computerized device component 210 may be an immersive first-person shooter gaming experience that employs the motion sensing input device $202_1$ and the consumer device $202_3$ (e.g., a gyroscope embedded within a pointing device) as sources of input data. The motion sensing input device $202_1$ provides coarse/low-resolution/high-level information associated with body joint movements and player position. In addition, the consumer device $202_3$ provides fine-grained, high-resolution information associated with a device orientation. If the consumer device $202_3$ is handheld, the consumer device $202_3$ may determine where the entity is 'looking' or aiming.

Continuing with the example, the sensor fusion interface 208 uses positional data from the motion sensing input device $202_1$ and an appropriate one of the support tools 222 to determine how a virtual character moves. From a central dead-zone, moving a step forward causes the virtual character to move forward and returning to a neutral, dead-zone causes the virtual character to stop. Data from the consumer device $202_3$ may control entity 'look' or the direction in which the virtual character faces. By holding the consumer device $202_3$ in his or her hands, as in a pointer or wand, the entity may direct the looking and walking direction of the virtual character. By combining these two modes of input, the entity is able to control the virtual character by 1) moving forward, back, left or right, and pointing the consumer device $202_3$ in a particular direction.

As another example, the computerized device component 210 may be a multi-room, multi-sensor music playlist system (e.g., hardware or a software component, such as an application or an operating system component) that tracks entity movement around a house, office or other indoor environment. The sensor fusion interface provides tracked entity movement data to the music playlist system via the entity state data or the profile 212 enabling digital music (sound) associated with a playlist to follow the entity to different rooms. Cameras for the motion sensing input device $202_1$ may be mounted in every participating room and capture a face of the entity as he/she walks into the room. The cameras may be connected to a central personal computer, which is running the music playlist system and playing the music through a speaker system. The entity may provide the music playlist system with playlists created by members of the household according to one implementation. After training the facial recognition module $202_4$ on ten-fifteen images of each member, the music playlist system may distinguish between different members and play an appropriate playlist.

If an entity walks in front of the camera, the sensor fusion interface 208 raises an event that someone entered a room. Upon receiving this event, the face recognition module $202_4$ captures an image from the camera and processes the image to recognize faces. Upon matching a face in the image with one of the players, a playlist associated with the player is retrieved and played. As the camera tracks position of the entity in the room, the music playlist system may adjust a level of detail of a visual display based on the entity's distance from the visual display. Although not a requirement, if the player is close to the display, the music playlist system presents a representation of album artwork for one or more of the songs in the playlist. When the player is standing far away, the music playlist system shows a zoomed in version of the artwork for only the currently playing song. The other interaction mode is voice. With commands prefixed with the keywords "Fusion", the entity may "Pause", "Resume", "Start Over" or "Skip" songs. The prefixed keywords allow the speech recognition module $202_2$ to eliminate any ambiguity, which the speech recognition module $202_2$ may encounter when analyzing ambient noise, people talking amongst themselves in the room, or indeed lyrics from the song being played.

When the entity leaves a room, the music playlist system saves a playlist state (e.g., a current song, a position within song and/or the like). If the same entity enters another room or re-enters the same room and is positively identified, the music playlist system resumes playing music from a last position. Consider a scenario in which the entity is listening to a song in the bedroom. When he or she leaves the bedroom and enters the kitchen, the song fades away in the bedroom and begins playing in the kitchen, providing a seamless listening experience. If two or more entities are in a same room, the computerized device component 210 identifies songs that are in the playlists of both players and alternately plays or otherwise switches among those. As an alternative, the computerized device component may play 'collaboratively created' playlists or use a music recommendation service based on individual interests.

Figure 3:
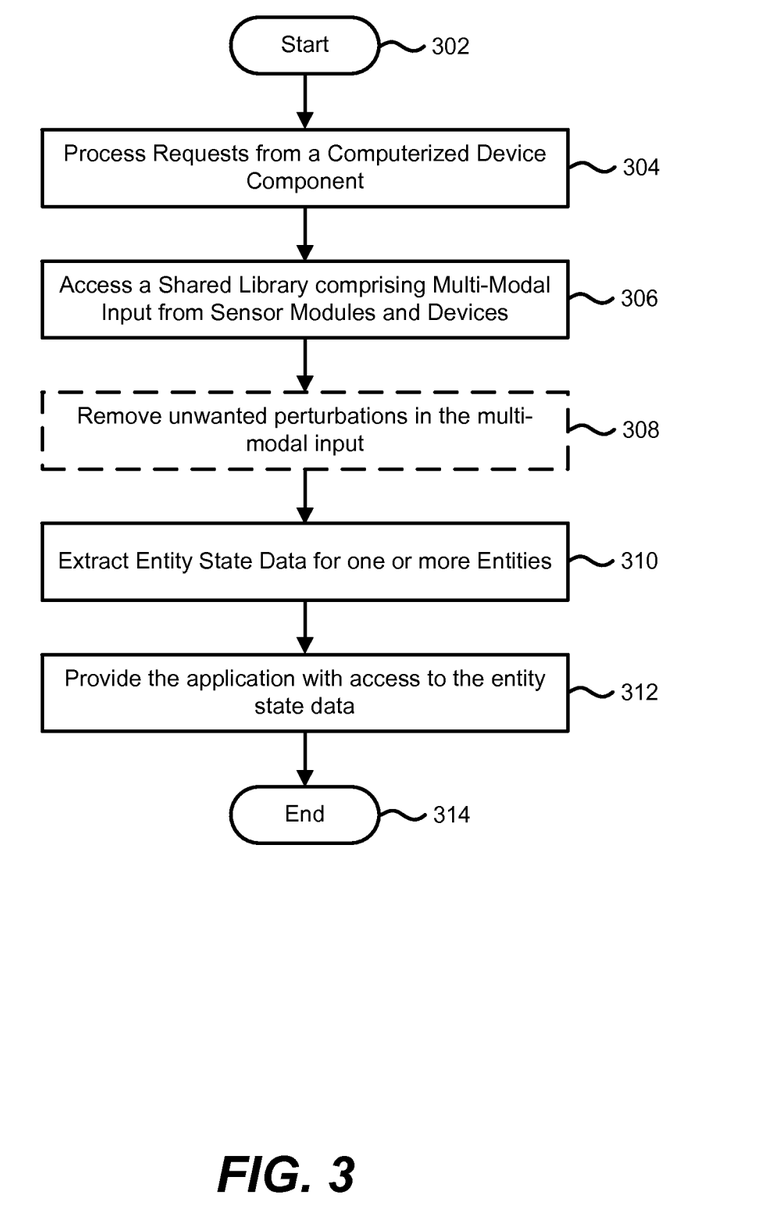
FIG. 3 is a flow diagram illustrating example steps for exposing a sensor fusion interface to a computerized device component according to one implementation.

FIG. 3 is a flow diagram illustrating example steps for exposing a sensor fusion interface to a computerized device component according to one implementation. The example steps may commence at step 302 and proceed to step 304 at which the sensor fusion interface 208 processes requests from a computerized device component. In one implementation, the sensor fusion interface 208 provides the computerized device component with access to multiple sensor input data that is tracked and integrated by the monitoring mechanism 104, such as a monitoring mechanism for a combined gaming console and a motion sensing input device (e.g., Microsoft® Kinect™ and Xbox™).

Step 306 is directed to accessing a shared library comprising multiple sensor input from sensor modules and devices. In one implementation, the shared library may be created by a system implementing a software design pattern known as a blackboard design pattern. Optional step 308 is directed to removing unwanted perturbations in the multiple sensor input in order to eliminate noise from the input data. Step 310 is directed to extracting entity state data for one or more entities. Step 312 refers to providing the computerized device component with access to the entity state data. In one implementation, the entity state data may be a portion of the multimodal input data that comprises an entity pose, a current command/control input for the computerized device component and one or more events (e.g., an event indicating that the entity travel outside of a sensing range. Step 314 terminates the example steps depicted in FIG. 3.

Figure 4:
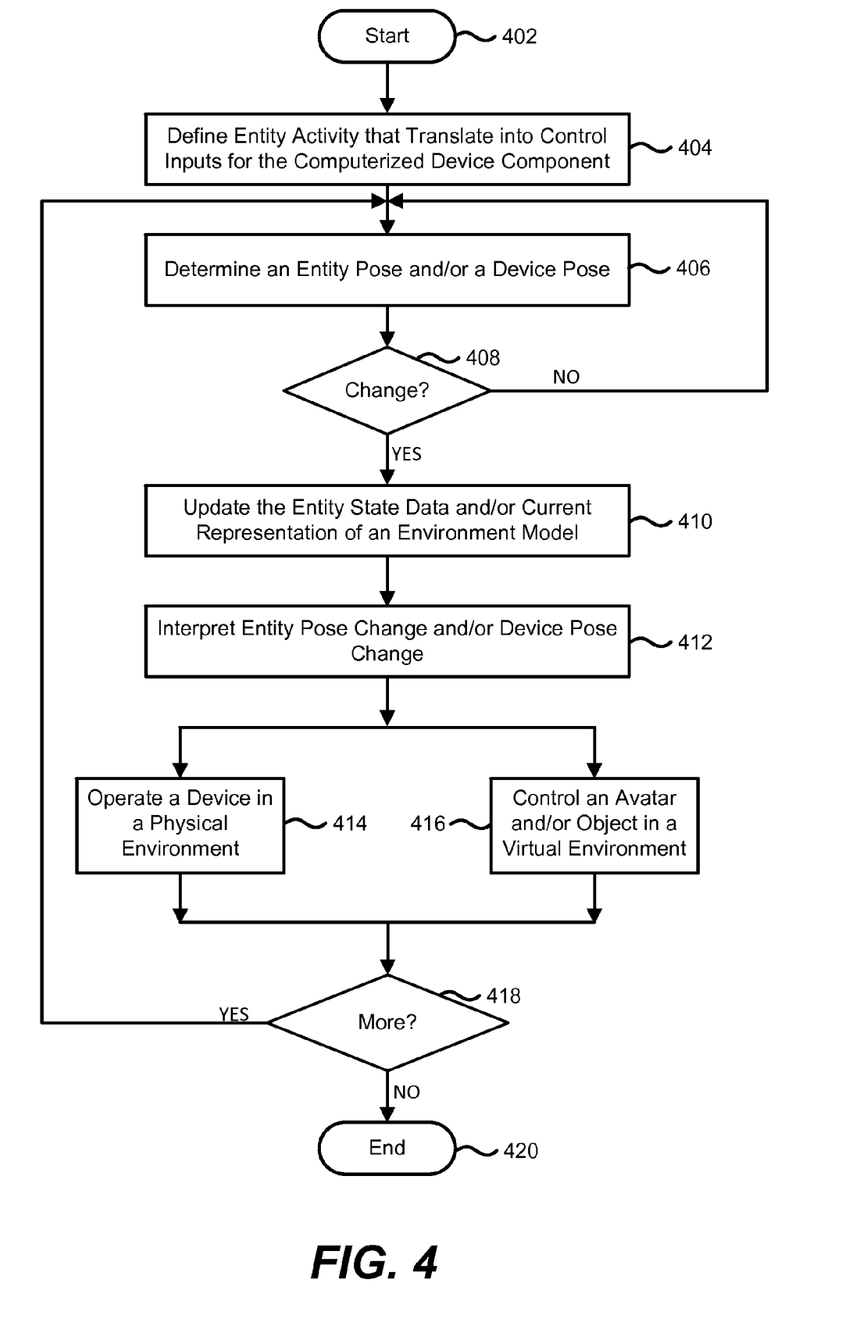
FIG. 4 is a flow diagram illustrating example steps for generating computerized device component control data from multiple sensor input according to one implementation.

FIG. 4 is a flow diagram illustrating example steps for generating control data from multiple sensor input according to one implementation. The example steps may commence at step 402 and proceed to step 404 at which the interaction mechanism processes configuration data defining entity activities that translate into control inputs for a computerized device component, such as a program or other software component (e.g., a gaming application). The interaction mechanism receives the configuration data via a sensor fusion interface. The entity activity may include (multi-modal) symbolic activity, such as combined speech/gesture data, that represents a specific command. The entity activity may also include actual movements that are to be projected onto a display and performed by a virtual character (e.g., an avatar representing the entity).

Step 406 refers to a determination of an entity pose and/or a device pose. The device may be a handheld device being manipulated or operated by the entity. Step 408 represents a determination as to whether the entity pose and/or the device pose changed from a previous point-in-time. If the entity pose and/or the device pose changed, step 408 proceeds to step 410. If the entity pose and/or the device pose remained the same as the entity pose and/or the device pose at the previous point-in-time, step 408 returns to step 406 and repeats the pose computations. Step 410 is directed to updating the entity state data and/or current representation of an environment model.

Step 412 is directed to interpreting entity pose change and/or device pose change as a command/control input for either a physical environment or a virtual environment. If the pose change and/or the device pose change represent a command/control input for a computerized device in the physical environment, step 412 proceeds to step 414 at which the entity uses the program to operate the computerized device. If the pose change and/or the device pose change represent a command/control input for the avatar or another object in the virtual environment (i.e., on a display), step 412 proceeds to step 416 at which the entity uses the program to control the avatar and/or the object in the virtual environment. Step 418 represents a determination as to whether there are more sensor inputs to fuse. If there are more sensor inputs to fuse, step 418 returns to step 406. If there are no more sensor inputs to fuse, step 418 proceeds to step 420. Step 420 terminates the example steps.

Figure 5:
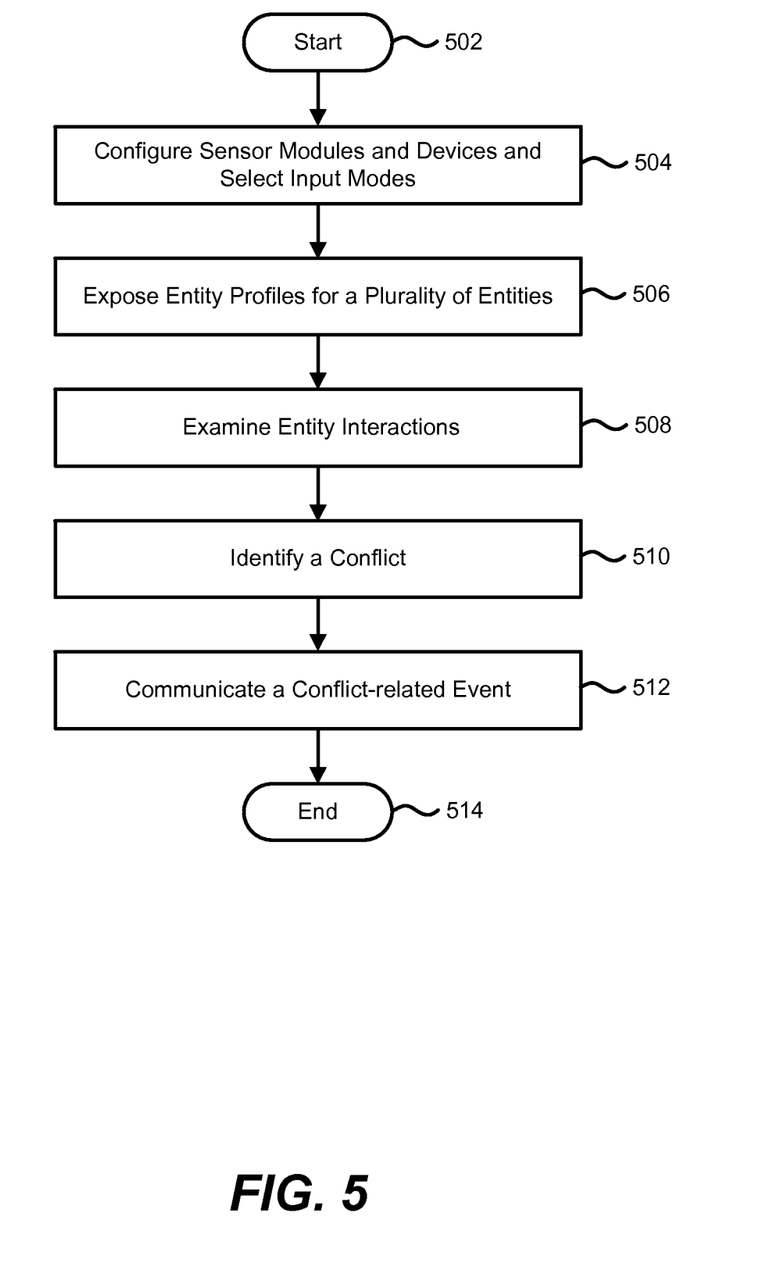
FIG. 5 is a flow diagram illustrating example steps for managing entity interactions according to one implementation.

FIG. 5 is a flow diagram illustrating example steps for managing entity interactions according to one implementation. The example steps may commence at step 502 and proceed to step 504 at which the interaction mechanism 106 configures sensor modules and select one or more input modes based on configuration data from a computerized device component. By default, the interaction mechanism may employ all possible input modes. In one implementation, the configuration data may indicate that an error should be returned if one of the selected input modes is not available. Step 506 represents exposing profiles for a plurality of entities that are within a physical environment. Step 508 is directed to examining entity interactions. For example, if the computerized device component is a first-person shooter game, the interaction mechanism 106 examines various entity related measurements that indicate which entities were shot/killed in the virtual environment.

Step 510 refers to identifying a conflict. If the computerized device component is a "music playing around the house" computerized device component, there may be a conflict when two entities with playlists occupy a same room in the house. Step 512 refers to communicating a conflict-related event to prompt the computerized device component into resolving the conflict. Step 514 terminates the steps depicted in FIG. 5.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
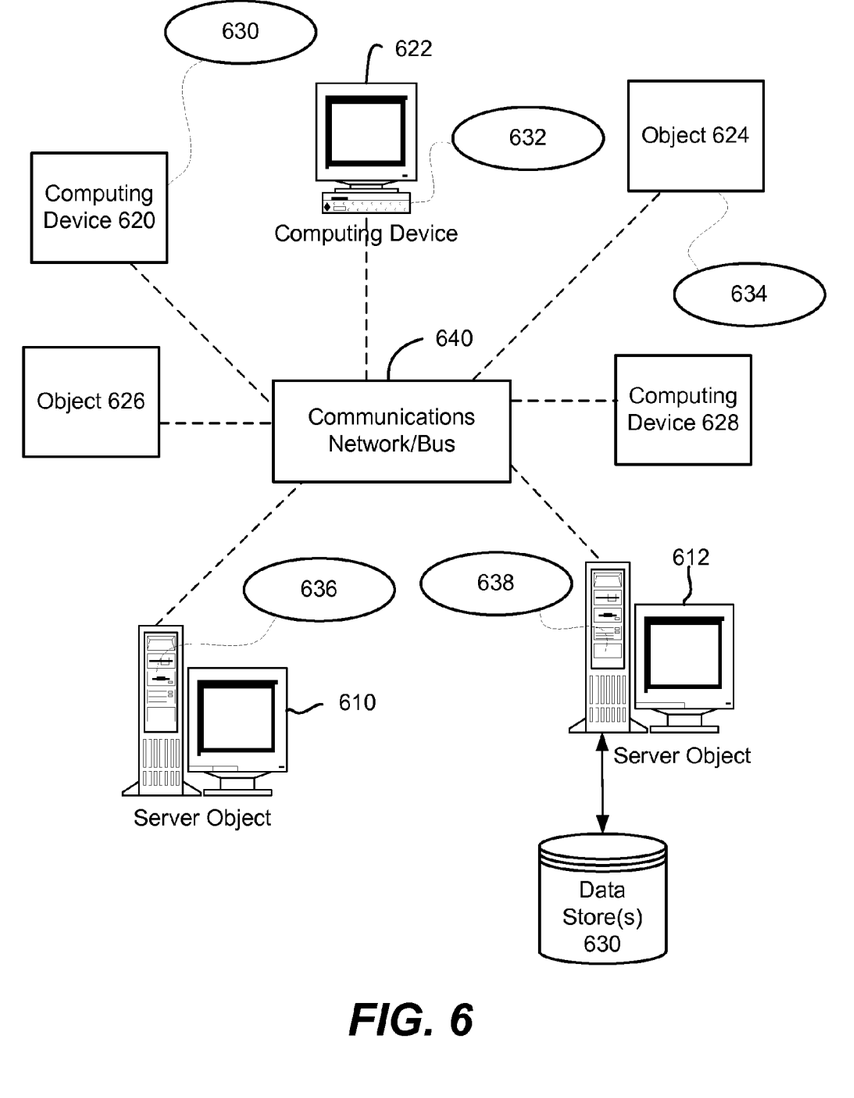
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
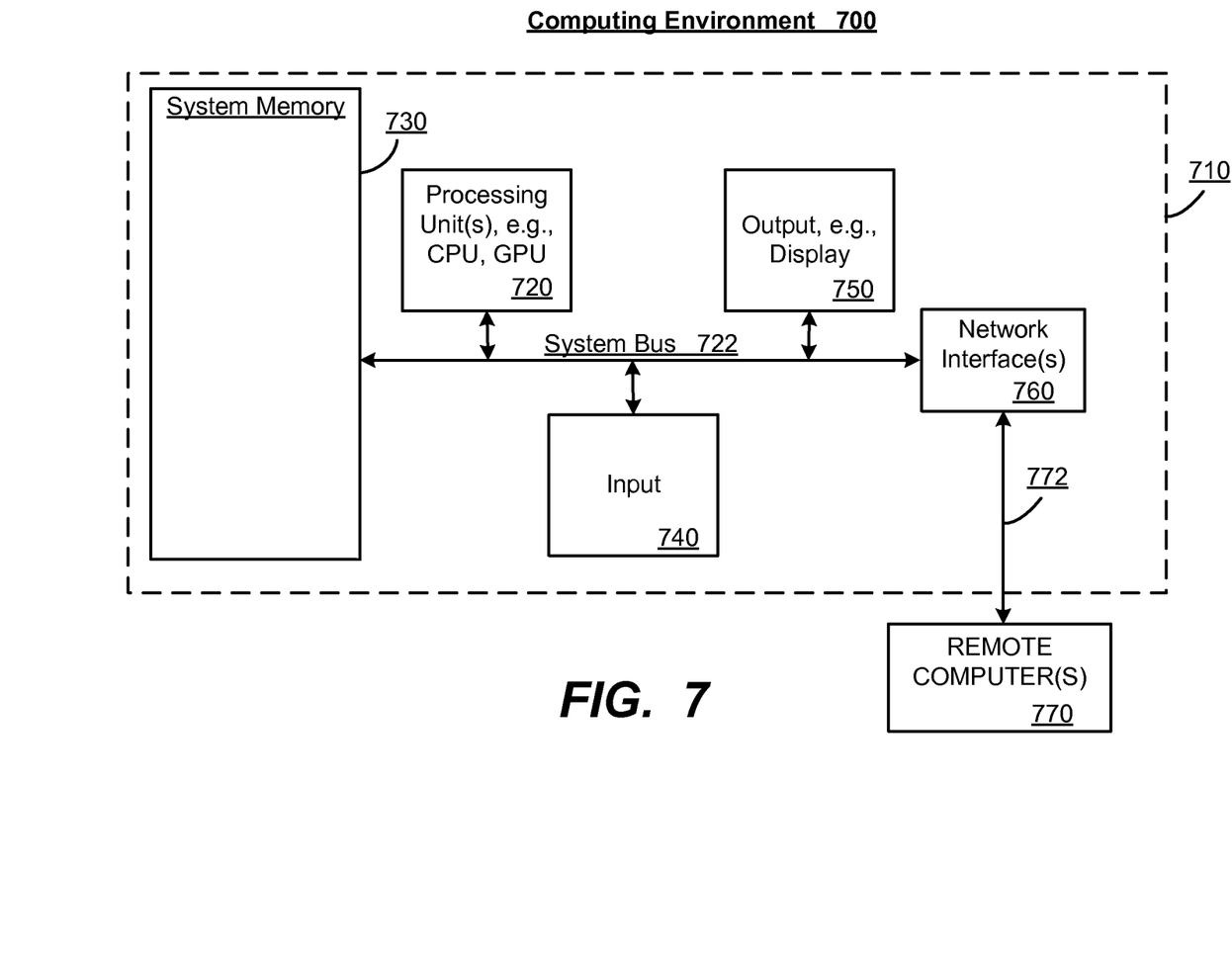
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   processing requests received via a sensor fusion interface to enable interaction between one or more entities and an computerized device component, including:
      accessing a shared library that is coupled to a plurality of sensor modules corresponding to at least two input modalities for the one or more entities, the shared library comprising a schematized version of multiple sensor input data to represent a cross-sensor synthesis;
      transforming the schematized version of the multiple sensor input data into entity state data; and
      performing at least one of communicating an event corresponding to a change in entity pose, generating control data corresponding to different points-in-time, or correlating a portion of the entity state data associated with an entity and another portion of the entity state data associated with another entity to determine entity interactions.

2. The method of claim 1 further comprising providing the computerized device component with access to the entity state data.

3. The method of claim 2, wherein providing the computerized device component with access to the entity state data further comprises communicating one or more commands for the computerized device component from the one or more entities.

4. The method of claim 2, wherein providing the computerized device component with access to the entity state data further comprises generating control data based on the change in entity pose.

5. The method of claim 1 further comprising determining a position and an orientation of a device being manipulated by the one or more entities.

6. The method of claim 1 further comprising removing unwanted perturbations in the multiple sensor input data.

7. The method of claim 1, wherein accessing the shared library further comprises configuring the plurality of sensor modules to refine the multiple sensor input data.

8. The method of claim 1 further comprising defining symbolic activity that translates into commands for the computerized device component.

9. The method of claim 1 further comprising updating the entity state data in response to entity movement.

10. The method of claim 1 further comprising producing an environment model associated with the one or more entities.

11. The method of claim 1 further comprising correlating different portions of the entity state data to determine entity interactions between two or more entities.

12. In a computing environment, a system, comprising, at least one processor, a memory communicatively coupled to the at least one processor and including components comprising:
    an interaction mechanism configured to provide a sensor fusion interface to an computerized device component, wherein, for each entity in an environment, the sensor fusion interface is configured to expose entity state data to the computerized device component, and to instruct a common knowledge data component to update the entity state data in response to entity activity, wherein the common knowledge data component is configured to integrate multi-modal input data from a plurality of sensor modules according to a uniform schema, to refine the multi-modal input data until a level of accuracy is achieved, and to identify the entity activity based on the refined multi-modal input data, including performing at least one of communicating an event corresponding to a change in entity pose, generating control data corresponding to different points-in-time, or correlating a portion of the entity state data associated with an entity and another portion of the entity state data associated with another entity to determine entity interactions.

13. The system of claim 12, wherein the interaction mechanism is further configured to operate a computerized device in the physical environment based on the entity activity.

14. The system of claim 12, wherein the interaction mechanism is further configured to control a virtual character on a virtual environment that is generated by the computerized device component.

15. The system of claim 12, wherein the interaction mechanism is further configured to initialize the plurality of sensor modules in response to the computerized device component.

16. The system of claim 12, wherein the interaction mechanism is further configured to identify a conflict between two or more entities.

17. The system of claim 12, wherein the interaction mechanism is further configured to expose an event that indicates entity movement out of a range of a device.

18. The system of claim 12, wherein the plurality of sensor modules include a camera, a microphone, a digitizer, a motion processor, a gaming controller, a speech recognition module, a gesture recognition module, a facial recognition module, a mobile phone or a pointing device, or any combination of a camera, a microphone, a digitizer, a motion processor, a gaming controller, a speech recognition module, a gesture recognition module, a facial recognition module, a mobile phone or a pointing device.

19. One or more computer-readable storage media having computer-executable instructions, which when executed perform steps, comprising:
    processing a request for entity state data associated with an entity in a physical environment;
    selecting at least two input modes among a plurality of input modes for producing the entity state data based on configuration data from a computerized device component, including processing a type system to format sensor input data corresponding to the plurality of input modes;
    fusing the sensor input data to generate the entity state data; and
    performing at least one of communicating to the computerized device component an event corresponding to a change in entity pose, generating control data corresponding to different points-in-time, or correlating a portion of the entity state data associated with an entity and another portion of the entity state data associated with another entity to determine entity interactions.

20. The one or more computer-readable storage media of claim 19 having further computer-executable instructions comprising:
    examining entity interactions associated with a plurality of entities; and
    communicating events to the computerized device component indicating conflicts corresponding to the entity interactions within the physical environment.

* * * * *